US012292383B2

(12) United States Patent
Katsutani et al.

(10) Patent No.: US 12,292,383 B2
(45) Date of Patent: May 6, 2025

(54) RAMAN INFRARED COMPOUND MICROSCOPE DEVICE

(71) Applicant: SHIMADZU CORPORATION, Kyoto (JP)

(72) Inventors: Fumiya Katsutani, Kyoto (JP); Tomoki Sasayama, Kyoto (JP); Tomoyo Tao, Kyoto (JP); Atsuhiko Otaguro, Kyoto (JP); Ryuta Shibutani, Kyoto (JP); Hisato Fukuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 168 days.

(21) Appl. No.: 18/214,507

(22) Filed: Jun. 26, 2023

(65) Prior Publication Data

US 2024/0094130 A1 Mar. 21, 2024

(30) Foreign Application Priority Data

Jun. 27, 2022 (JP) ................................ 2022-102576

(51) Int. Cl.
| | |
|---|---|
| *G01N 21/65* | (2006.01) |
| *G01J 3/02* | (2006.01) |
| *G01J 3/10* | (2006.01) |
| *G01J 3/44* | (2006.01) |
| *G02B 21/06* | (2006.01) |

(52) U.S. Cl.
CPC ............ *G01N 21/65* (2013.01); *G01J 3/0208* (2013.01); *G01J 3/10* (2013.01); *G01J 3/44* (2013.01); *G02B 21/06* (2013.01); *G01J 2003/102* (2013.01)

(58) Field of Classification Search
CPC .................. G01N 21/65; G01N 21/35; G01N 2021/0112; G01J 2003/102
See application file for complete search history.

(56) References Cited

U.S. PATENT DOCUMENTS 5,841,139 A * 11/1998 Sostek ...................... G01J 3/44
250/339.05
2021/0033457 A1* 2/2021 Khoury ..................... G01J 3/12
2021/0381976 A1 12/2021 Ikehara

FOREIGN PATENT DOCUMENTS

WO 2020075548 4/2020

* cited by examiner

*Primary Examiner* — Abdullahi Nur
*Assistant Examiner* — Mohamed Doumbia
(74) *Attorney, Agent, or Firm* — JCIPRNET (57) ABSTRACT

A Raman infrared compound microscope device includes: a first light source that generates laser light; a second light source that generates infrared light; a third light source that generates visible light; and a first optical system. The first optical system orients the visible light having reached the first optical system in different directions between when performing a Raman analysis using Raman light generated from a sample by irradiation of the laser light and when performing a first infrared analysis using the infrared light having passed through the sample.

5 Claims, 8 Drawing Sheets

RAMAN INFRARED COMPOUND MICROSCOPE DEVICE

BACKGROUND OF THE INVENTION

Field of the Invention

The present disclosure relates to a Raman infrared compound microscope device.

Description of the Background Art

For example, WO 2020/075548 describes a microspectroscope device. The microspectroscope device described in WO 2020/075548 can perform both a Raman analysis and an infrared analysis.

SUMMARY OF THE INVENTION

It is preferable that a state of a sample can be observed with visible light while a Raman analysis and an infrared analysis are performed. However, in the case where both a visible light source used when performing the Raman analysis and a visible light source used when performing the infrared analysis are incorporated in order to perform such observations, the device becomes large in size.

The present disclosure has been made in view of the above problem of the conventional art. More specifically, the present disclosure provides a Raman infrared compound microscope device having a small size.

A Raman infrared compound microscope device according to the present disclosure includes: a first light source that generates laser light; a second light source that generates infrared light; a third light source that generates visible light; and a first optical system. The first optical system orients the visible light having reached the first optical system in different directions between when performing a Raman analysis using Raman light generated from a sample by irradiation of the laser light and when performing a first infrared analysis using the infrared light having passed through the sample.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Details of embodiments of the present disclosure will be described with reference to figures. In the below-described figures, the same or corresponding portions are denoted by the same reference characters and the same explanation will not be described repeatedly. A Raman infrared compound microscope device according to an embodiment is referred to as a Raman infrared compound microscope device 100.

(Configuration of Raman Infrared Compound Microscope Device 100)

A configuration of a Raman infrared compound microscope device 100 will be described below.

Figure 1:
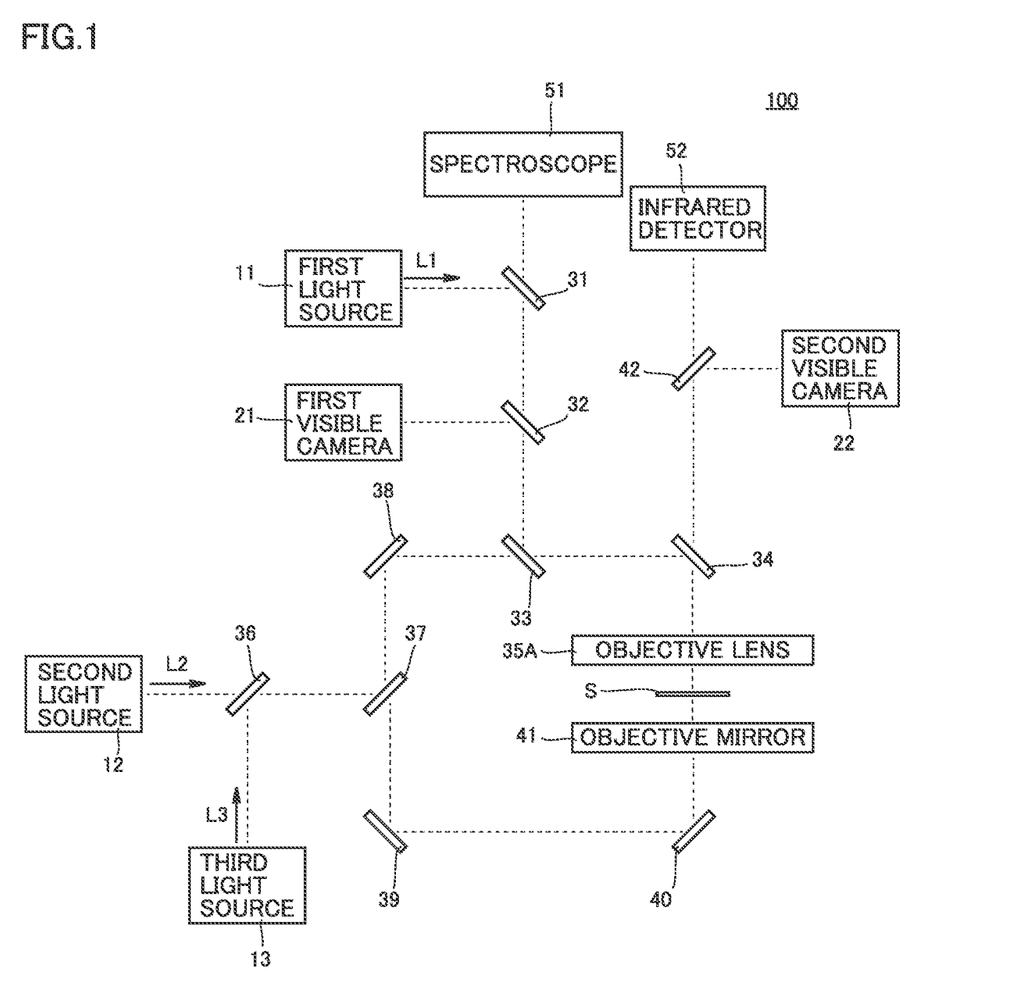
FIG. 1 is a schematic diagram of a Raman infrared compound microscope device 100.

FIG. 1 is a schematic diagram of a Raman infrared compound microscope device 100. As shown in FIG. 1, Raman infrared compound microscope device 100 has a first light source 11, a second light source 12, and a third light source 13. First light source 11 is a light source that generates laser light L1. Second light source 12 is a light source that generates infrared light L2. Third light source 13 is a light source that generates visible light L3.

Raman infrared compound microscope device 100 further has a first visible camera 21 and a second visible camera 22. Each of first visible camera 21 and second visible camera 22 is a camera that can capture an image with visible light. Raman infrared compound microscope device 100 further has a beam splitter 31, a beam splitter 32, a switching beam splitter 33, an edge mirror 34, and an objective lens 35A.

Raman infrared compound microscope device 100 further has a beam splitter 36, a switching mirror 37, a mirror 38, a mirror 39, a mirror 40, an objective mirror 41, and a beam splitter 42. Raman infrared compound microscope device 100 further has a spectroscope 51 and an infrared detector 52.

<Raman Analysis>

Figure 2:
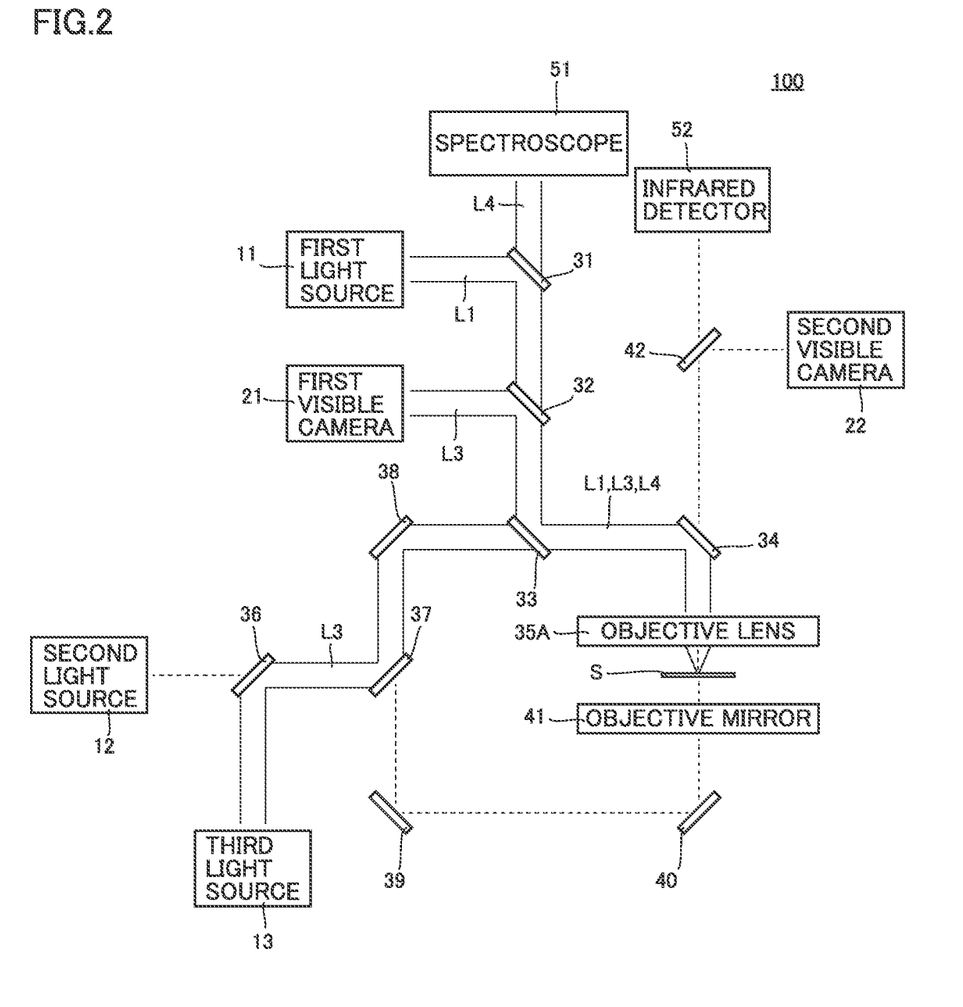
FIG. 2 is a schematic diagram illustrating a Raman analysis performed using Raman infrared compound microscope device 100.

FIG. 2 is a schematic diagram illustrating a Raman analysis performed using Raman infrared compound microscope device 100. As shown in FIG. 2, when performing the Raman analysis, laser light L1 is reflected by beam splitter 31. Laser light L1 reflected by beam splitter 31 passes through beam splitter 32, and is then reflected by switching beam splitter 33. Laser beam L1 reflected by switching beam splitter 33 is reflected by edge mirror 34, then passes through objective lens 35A, and is collected on a sample S. Objective lens 35A may be an objective lens having a general configuration.

With sample S being irradiated with laser light L1, Raman light L4 is generated. Raman light L4 passes through objective lens 35A. Raman light L4 having passed through objective lens 35A is reflected by edge mirror 34. Raman light L4 reflected by edge mirror 34 is reflected by switching beam splitter 33. Raman light L4 reflected by switching beam splitter 33 passes through beam splitter 32 and beam splitter 31, and enters spectroscope 51. In spectroscope 51, the Raman analysis is performed using Raman light L4.

When performing the Raman analysis, visible light L3 is reflected by beam splitter 36. Visible light L3 reflected by beam splitter 36 is reflected by switching mirror 37. Visible light L3 reflected by switching mirror 37 is reflected by mirror 38. Visible light L3 reflected by mirror 38 passes through switching beam splitter 33, and is then reflected by edge mirror 34. Visible light L3 reflected by edge mirror 34 passes through objective lens 35A and sample S is irradiated therewith.

Visible light L3 reflected by sample S passes through objective lens 35A and is then reflected by edge mirror 34. Visible light L3 reflected by edge mirror 34 is reflected by switching beam splitter 33. Visible light L3 reflected by switching beam splitter 33 is reflected by beam splitter 32, and then enters first visible camera 21. Thus, sample S when performing the Raman analysis is observed.

<First Infrared Analysis>

Figure 3:
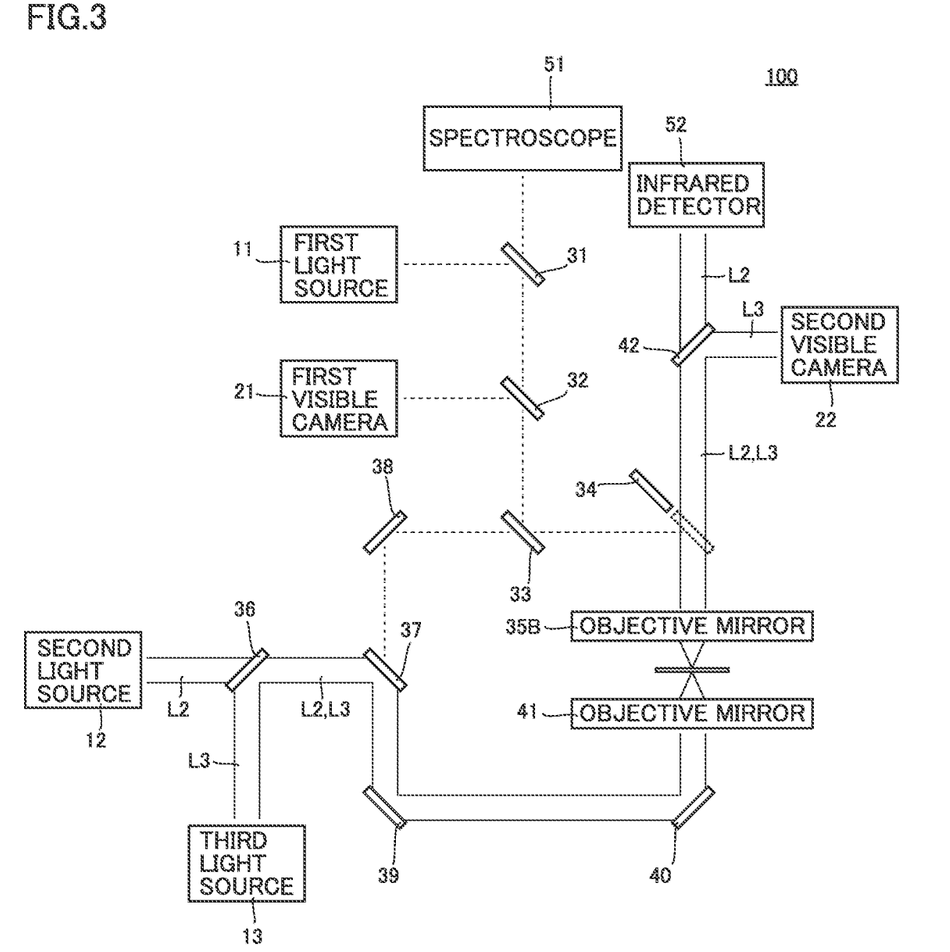
FIG. 3 is a schematic diagram illustrating a first infrared analysis performed using Raman infrared compound microscope device 100.

FIG. 3 is a schematic diagram illustrating a first infrared analysis performed using Raman infrared compound microscope device 100. As shown in FIG. 3, when performing the first infrared analysis, infrared light L2 passes through beam splitter 36 and is then reflected by switching mirror 37. Switching mirror 37 is oriented in a direction different from the direction when performing the Raman analysis. Therefore, infrared light L2 reflected by switching mirror 37 is oriented in a direction different from that of visible light L3 reflected by switching mirror 37 when performing the Raman analysis. Infrared light L2 reflected by switching mirror 37 is reflected by mirror 39. Infrared light L2 reflected by mirror 39 is reflected by mirror 40. Infrared light L2 reflected by mirror 40 passes through objective mirror 41, sample S, and objective mirror 35B. It should be noted that when performing the first infrared analysis, edge mirror 34 is not inserted. Moreover, when performing the first infrared analysis, objective mirror 35B is used instead of objective lens 35A. Although not shown, objective lens 35A and objective mirror 35B are attached to a revolver, and switching between objective lens 35A and objective mirror 35B is performed by revolving the revolver.

Figure 4:
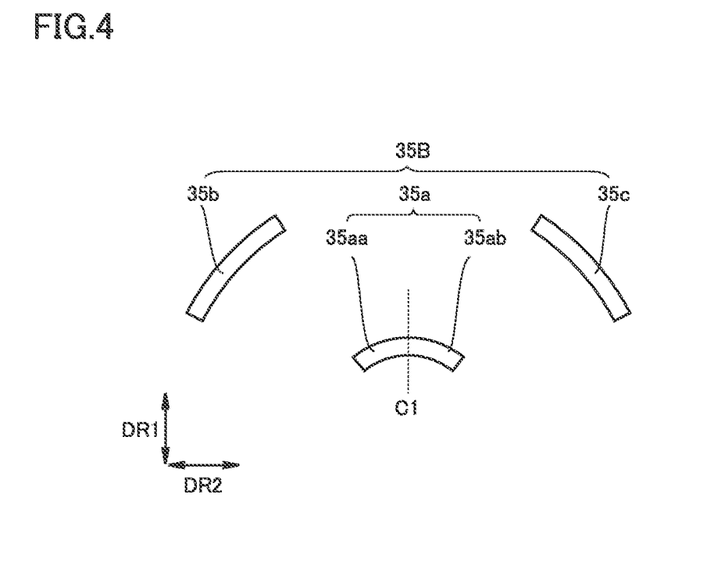
FIG. 4 is a schematic diagram of an objective mirror 35B.

FIG. 4 is a schematic diagram of objective mirror 35B. As shown in FIG. 4, objective mirror 35B has an aspherical mirror 35a, a spherical mirror 35b, and a spherical mirror 35c. A direction of the optical axis of objective mirror 35B is defined as a first direction DR1. A direction orthogonal to first direction DR1 is defined as a second direction DR2. In FIG. 4, center position C1 of aspherical mirror 35a in second direction DR2 is indicated by a dotted line. Spherical mirror 35c is disposed to be symmetrical to spherical mirror 35b with respect to center position C1. A portion of aspherical mirror 35a on one side (the spherical mirror 35b side) with respect to center position C1 in second direction DR2 is defined as a first portion 35aa. A portion of aspherical mirror 35a on the other side (the spherical mirror 35c side) with respect to center position C1 in second direction DR2 is defined as a second portion 35ab.

Figure 5:
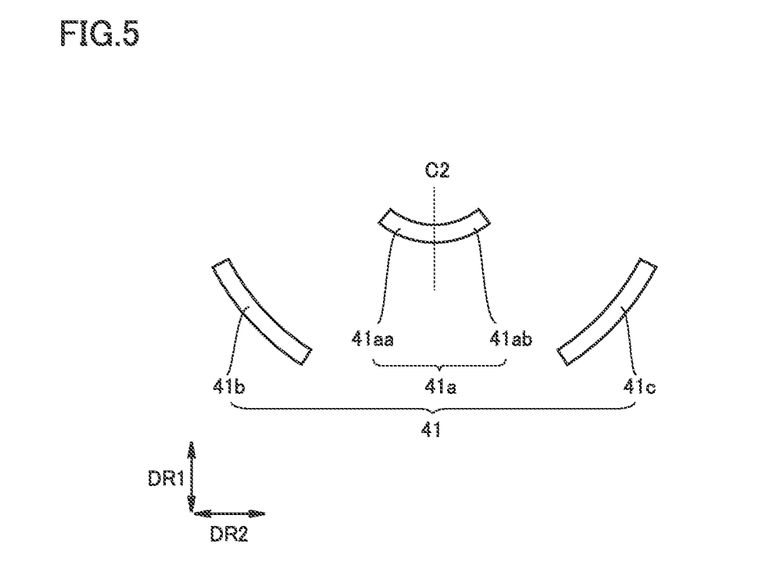
FIG. 5 is a schematic diagram of an objective mirror 41.

FIG. 5 is a schematic diagram of objective mirror 41. As shown in FIG. 5, objective mirror 41 has an aspherical mirror 41a, a spherical mirror 41b, and a spherical mirror 41c. A direction of the optical axis of objective mirror 41 is along first direction DR1. In FIG. 5, center position C2 of aspherical mirror 41a in second direction DR2 is indicated by a dotted line. Spherical mirror 41c is disposed to be symmetrical to spherical mirror 41b with respect to center position C2. A portion of aspherical mirror 41a on one side (the spherical mirror 41b side) with respect to center position C2 in second direction DR2 is defined as a first portion 41aa. A portion of aspherical mirror 41a on the other side (the spherical mirror 41c side) with respect to center position C2 in second direction DR2 is defined as a second portion 41ab.

Figure 6:
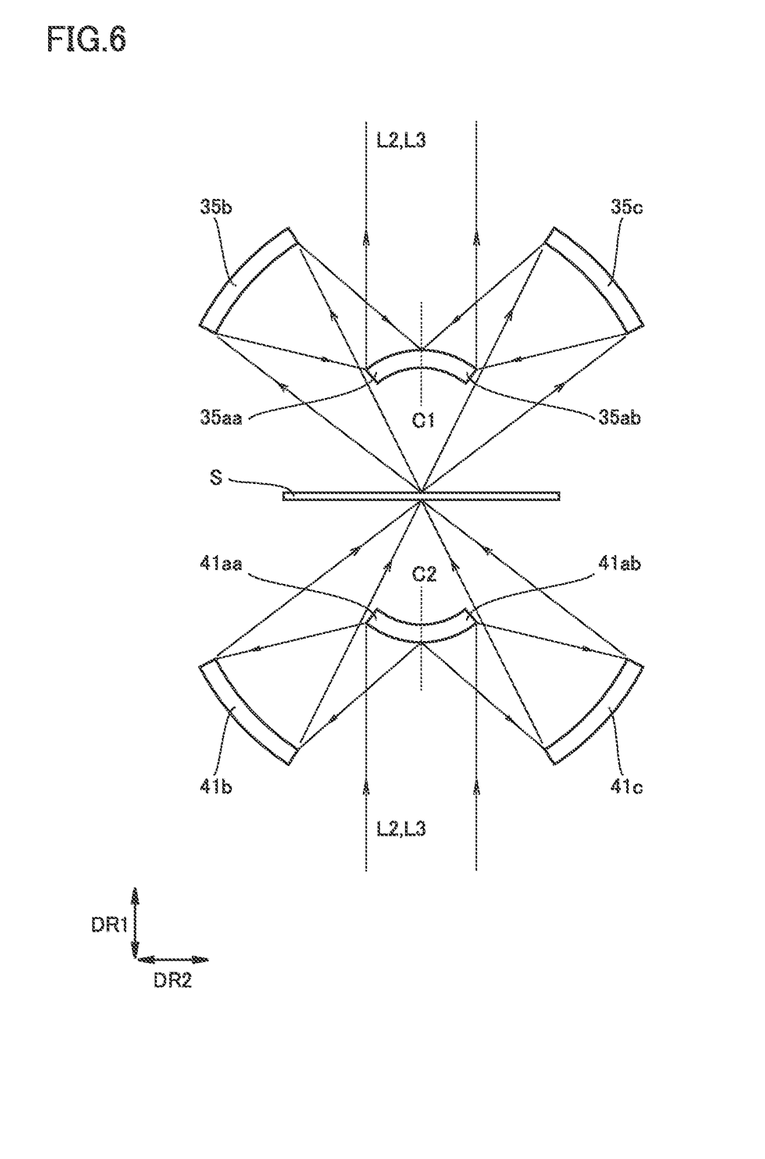
FIG. 6 is a schematic diagram when infrared light L2 passes through objective mirror 41, a sample S, and objective mirror 35B.

FIG. 6 is a schematic diagram when infrared light L2 passes through objective mirror 41, sample S, and objective mirror 35B. As shown in FIG. 6, part of infrared light L2 having entered objective mirror 41 is reflected by first portion 41aa and is further reflected by spherical mirror 41b. The other part of infrared light L2 having entered objective mirror 41 is reflected by second portion 41ab and is further reflected by spherical mirror 41c. Thus, infrared light L2 is collected and then passes through sample S.

Part of infrared light L2 having passed through sample S is reflected by spherical mirror 35b and first portion 35aa. Similarly, the other part of infrared light L2 having passed through sample S is reflected by spherical mirror 35c and second portion 35ab. Thus, infrared light L2 having passed through sample S passes through objective mirror 35B and accordingly becomes parallel to first direction DR1.

As shown in FIG. 3, infrared light L2 having passed through objective mirror 41, sample S, and objective mirror 35B passes through beam splitter 42 and enters infrared detector 52. In infrared detector 52, the first infrared analysis is performed using infrared light L2 having passed through sample S.

When performing the first infrared analysis, visible light L3 is reflected by beam splitter 36. Visible light L3 reflected by beam splitter 36 is reflected by switching mirror 37. When performing the first infrared analysis, switching mirror 37 is oriented in a direction different from the direction when performing the Raman analysis as described above, so that visible light L3 reflected by switching mirror 37 is oriented in the direction different from that of visible light L3 reflected by switching mirror 37 when performing the Raman analysis. Visible light L3 reflected by switching mirror 37 is reflected by mirror 39. Visible light L3 reflected by mirror 39 is reflected by mirror 40. Visible light L3 reflected by mirror 40 passes through objective mirror 41, sample S, and objective mirror 35B (see FIG. 3).

Visible light L3 having passed through objective mirror 41, sample S, and objective mirror 35B is reflected by beam splitter 42, and then enters second visible camera 22. Thus, sample S when performing the first infrared analysis is observed.

<Second Infrared Analysis>

Figure 7:
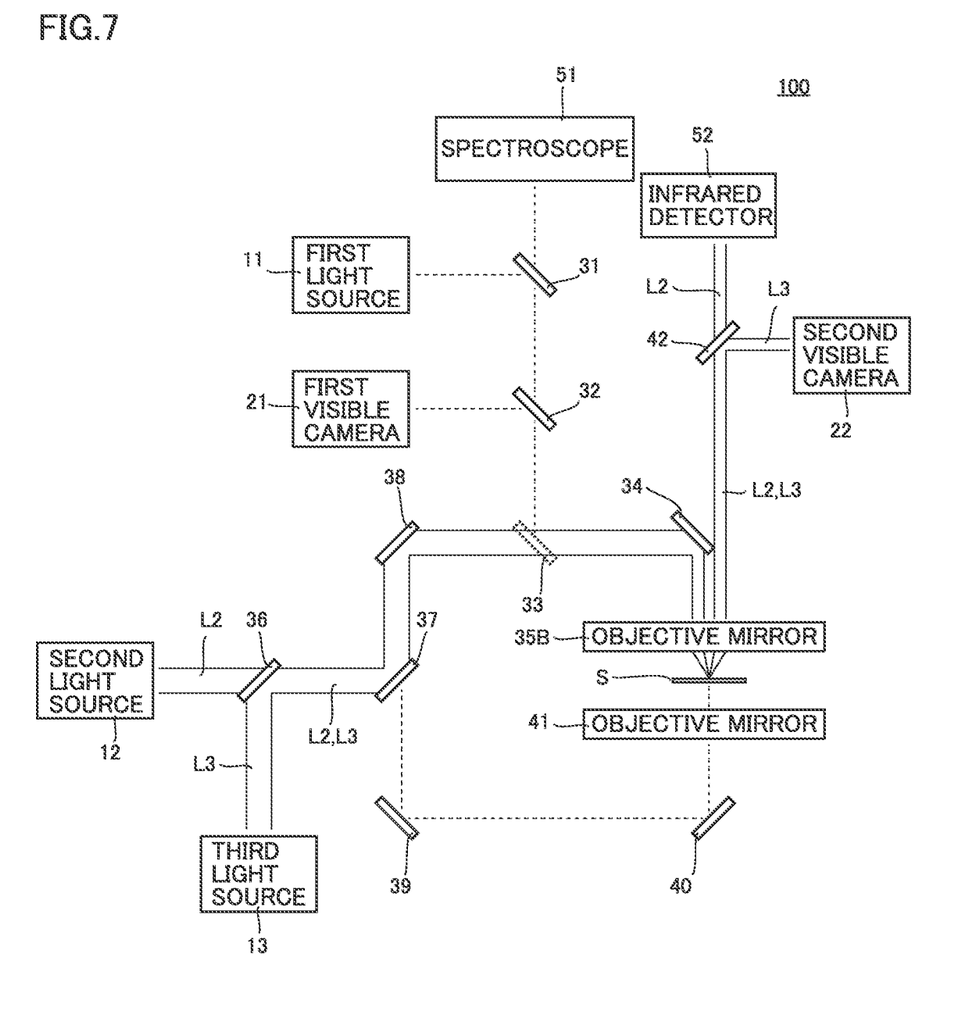
FIG. 7 is a schematic diagram illustrating a second infrared analysis performed using Raman infrared compound microscope device 100.

FIG. 7 is a schematic diagram illustrating a second infrared analysis performed using Raman infrared compound microscope device 100. As shown in FIG. 7, when performing the second infrared analysis, infrared light L2 passes through beam splitter 36 and is then reflected by switching mirror 37. Switching mirror 37 is oriented in the same direction as the direction when performing the Raman analysis. Therefore, infrared light L2 reflected by switching mirror 37 is oriented in the same direction as the direction of visible light L3 reflected by switching mirror 37 when performing the Raman analysis. Infrared light L2 reflected by switching mirror 37 is reflected by mirror 38.

When performing the second infrared analysis, switching beam splitter 33 has been removed from the optical path between mirror 38 and edge mirror 34. Therefore, infrared light L2 reflected by mirror 38 is reflected by edge mirror 34. When performing the second infrared analysis, unlike when performing the Raman analysis, edge mirror 34 is only partially inserted. Therefore, infrared light L2 reflected by edge mirror 34 partially enters objective mirror 35B.

Figure 8:
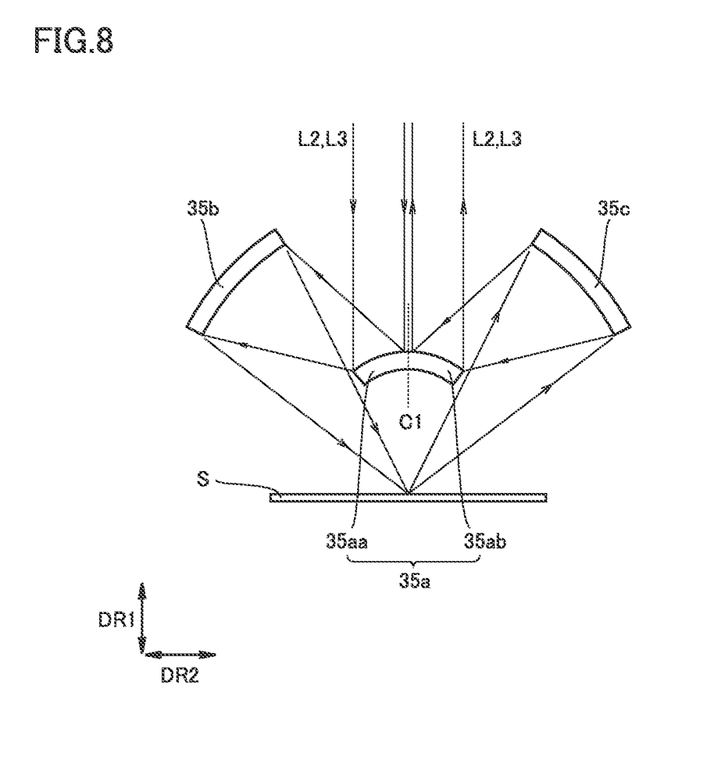
FIG. 8 is a schematic diagram when infrared light L2 passes through objective mirror 35B.

When performing the second infrared analysis, objective mirror 35B is used in the same manner as when performing the first infrared analysis. FIG. 8 is a schematic diagram when infrared light L2 passes through objective mirror 35B. As shown in FIG. 8, infrared light L2 having entered objective mirror 35B is reflected only by first portion 35aa. Infrared light L2 reflected by first portion 35aa is reflected by spherical mirror 35b and collected on sample S. Infrared light L2 reflected by sample S is reflected by spherical mirror 35c and second portion 35ab.

As shown in FIG. 7, infrared light L2 reflected by second portion 35ab passes through beam splitter 42 and enters infrared detector 52 without being blocked by edge mirror 34. In infrared detector 52, the first infrared analysis is performed using infrared light L2 reflected by sample S.

When performing the second infrared analysis, visible light L3 is reflected by beam splitter 36. Visible light L3 reflected by beam splitter 36 is reflected by switching mirror 37. When performing the second infrared analysis, switching mirror 37 is oriented in the same direction as the direction when performing the Raman analysis as described above, so that visible light L3 reflected by switching mirror 37 is oriented in the same direction as the direction of visible light L3 reflected by switching mirror 37 when performing the Raman analysis. Visible light L3 reflected by switching mirror 37 is reflected by mirror 38.

Visible light L3 reflected by mirror 38 is partially reflected by edge mirror 34 and then passes through objective mirror 35B (see FIG. 7), and sample S is irradiated therewith. Visible light L3 reflected by sample S is reflected by beam splitter 42 without being blocked by edge mirror 34, and then enters second visible camera 22. Thus, sample S when performing the second infrared analysis is observed.

Although switching mirror 37 is used in the above example, switching mirror 37 is an example of the optical system that orients visible light L3 in the different directions between when performing the Raman analysis and when performing the first infrared analysis and that orients visible light L3 in the same direction between when performing the Raman analysis and when performing the second infrared analysis. Therefore, an optical system that can achieve such a function can be used instead of switching mirror 37. Although edge mirror 34 is used in the above example, edge mirror 34 is an example of the optical system that reflects visible light L3 when performing the Raman analysis so as to cause visible light L3 to enter first visible camera 21 and that causes visible light L3 to pass therethrough when performing the second infrared analysis. Therefore, an optical system that can achieve such a function can be used instead of edge mirror 34. Also, the other optical systems can be replaced with optical systems having similar functions.

(Effect of Raman Infrared Compound Microscope Device 100)

Effects of Raman infrared compound microscope device 100 will be described below.

In Raman infrared compound microscope device 100, switching mirror 37 orients visible light L3 in different directions between when performing the Raman analysis and when performing the first infrared analysis. More specifically, when performing the Raman analysis, visible light L3 is oriented toward mirror 38, with the result that visible light L3 can enter first visible camera 21 using switching beam splitter 33, edge mirror 34, objective lens 35A, and beam splitter 32.

On the other hand, when performing the first infrared analysis, visible light L3 is oriented toward mirror 39, with the result that visible light L3 can enter second visible camera 22 using mirror 40, objective mirror 41, objective mirror 35B, and beam splitter 42. In this way, in Raman infrared compound microscope device 100, third light source 13 is used both when performing the Raman analysis and when performing the first infrared analysis, thereby achieving downsizing.

In Raman infrared compound microscope device 100, with the switching of edge mirror 34, visible light L3 can enter first visible camera 21 when performing the Raman analysis, and visible light L3 can enter second visible camera 22 when performing the second infrared analysis. More specifically, when performing the Raman analysis, edge mirror 34 is inserted and accordingly reflects both visible light L3 before sample S is irradiated therewith and visible light L3 reflected by sample S, with the result that visible light L3 reflected by sample S can enter first visible camera 21 using switching beam splitter 33 and beam splitter 32.

On the other hand, when performing the second infrared analysis, edge mirror 34 is partially inserted and accordingly reflects visible light L3 before sample S is irradiated therewith but does not reflect visible light L3 reflected by sample S, with the result that visible light L3 reflected by sample S can enter second visible camera 22 using beam splitter 42. In this way, in Raman infrared compound microscope device 100, even when there are a plurality of analysis modes in the infrared analysis, third light source 13 can be used for both the modes, thereby achieving downsizing.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A Raman infrared compound microscope device comprising:
   a first light source that generates laser light;
   a second light source that generates infrared light;
   a third light source that generates visible light; and
   a first optical system, wherein
   the first optical system orients the visible light having reached the first optical system in different directions between when performing a Raman analysis using Raman light generated from a sample by irradiation of the laser light and when performing a first infrared analysis using the infrared light having passed through the sample.

2. The Raman infrared compound microscope device according to claim 1, wherein the first optical system orients the visible light having reached the first optical system in the same direction between when performing the Raman analysis and when performing a second infrared analysis using the infrared light reflected by the sample.

3. The Raman infrared compound microscope device according to claim 2, further comprising:
   a first visible camera; and
   a second visible camera, wherein
   when performing the Raman analysis, the visible light is reflected by the sample and then enters the first visible camera, and
   when performing the first infrared analysis, the visible light passes through the sample and then enters the second visible camera.

4. The Raman infrared compound microscope device according to claim 3, wherein when performing the second infrared analysis, the visible light is reflected by the sample and then enters the second visible camera.

5. The Raman infrared compound microscope device according to claim 4, further comprising a second optical system, wherein when performing the Raman analysis, the second optical system reflects the visible light reflected by the sample so as to cause the visible light to enter the first visible camera, and when performing the second infrared analysis, the second optical system causes the visible light reflected by the sample to pass through the second optical system and to enter the second visible camera.

* * * * *